United States Patent
Aaltonen et al.

(10) Patent No.: US 11,293,756 B2
(45) Date of Patent: Apr. 5, 2022

(54) CONTINUOUS SELF-TEST OF A GYROSCOPE

(71) Applicant: MURATA MANUFACTURING CO., LTD., Nagaokakyo (JP)

(72) Inventors: Lasse Aaltonen, Espoo (FI); Jouni Erkkilä, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 7 days.

(21) Appl. No.: 16/890,587

(22) Filed: Jun. 2, 2020

(65) Prior Publication Data

US 2020/0400433 A1 Dec. 24, 2020

(30) Foreign Application Priority Data

Jun. 19, 2019 (FI) .................................... 20195537

(51) Int. Cl.
*G01C 19/5712* (2012.01)
*G01C 19/5776* (2012.01)

(52) U.S. Cl.
CPC ..... *G01C 19/5712* (2013.01); *G01C 19/5776* (2013.01)

(58) Field of Classification Search
CPC ............ G01C 19/5776; G01C 19/5712; G01C 19/5726; G01C 19/5649
See application file for complete search history.

(56) References Cited

U.S. PATENT DOCUMENTS

| | | | |
|---|---|---|---|
| 6,982,538 B2 * | 1/2006 | White | G01C 19/56 318/702 |
| 7,127,932 B2 | 10/2006 | Morell et al. | |
| 8,912,856 B2 * | 12/2014 | Cazzaniga | G01P 15/097 331/154 |
| 9,077,283 B2 * | 7/2015 | Kim | H03D 3/009 |
| 9,109,901 B2 | 8/2015 | Fang et al. | |

(Continued)

OTHER PUBLICATIONS

European Search Report dated Oct. 14, 2020 corresponding to European Patent Application No. 20175172.

(Continued)

*Primary Examiner* — Helen C Kwok
(74) *Attorney, Agent, or Firm* — Squire Patton Boggs (US) LLP (57) ABSTRACT

A microelectromechanical gyroscope includes a drive loop having a drive element and a drive loop circuitry. The drive loop circuitry includes a clock generating circuitry for generating from the quadrature-phase detection signal a test clock signal, an angular rate phase demodulation signal and a quadrature phase demodulation signal. A sense loop includes a sense element and sense loop circuitry for detecting angular rate and producing a force-feedback signal. A test signal generator receives a quadrature-phase detection signal to be used as a quadrature-phase carrier signal and the test clock signal A summing element sums a test signal with the force-feedback signal to form a sense feedback signal. A rate phase demodulator produces a rate signal by demodulating a sense signal received from the sense loop with the angular rate phase demodulation signal, and a quadrature-phase demodulator produces a quadrature-phase output signal.

12 Claims, 9 Drawing Sheets

(56) References Cited

U.S. PATENT DOCUMENTS

| | | | |
|---|---|---|---|
| 9,410,806 B2 * | 8/2016 | Ezekwe | G01C 19/5776 |
| 9,702,898 B1 * | 7/2017 | Lipka | G01C 19/5776 |
| 9,846,037 B2 | 12/2017 | Aaltonen | |
| 2010/0263445 A1 * | 10/2010 | Hayner | G01C 19/56 |
| | | | 73/504.12 |
| 2011/0192226 A1 | 8/2011 | Hayner | |
| 2014/0250970 A1 | 9/2014 | Fang et al. | |
| 2015/0377625 A1 | 12/2015 | Aaltonen | |
| 2017/0023364 A1 | 1/2017 | Gregory | |
| 2018/0017385 A1 * | 1/2018 | Shirvani | G01C 19/56 |
| 2018/0128613 A1 * | 5/2018 | Jandak | G01C 19/5691 |

OTHER PUBLICATIONS

Finnish Search Report dated Jan. 15, 2020 corresponding to Finnish Patent Application No. 20195537.

\* cited by examiner

Figure 4B time/s

CONTINUOUS SELF-TEST OF A GYROSCOPE

FIELD

The present invention relates to microelectromechanical devices and specifically to an inertial sensor with continuous self-test capability and a continuous self-test method for an inertial sensor.

BACKGROUND

Micro-Electro-Mechanical Systems or MEMS can be defined as micro-scale mechanical and electro-mechanical systems where at least some elements have a mechanical functionality. MEMS structures can be applied to quickly and accurately detect very small changes in physical properties.

Motion can be considered to have six degrees of freedom: translations in three orthogonal directions and rotations around three orthogonal axes. The latter three may be measured by an angular rate sensor, also known as a gyroscope. MEMS gyroscopes use the Coriolis Effect to measure the angular rate. When a mass is moving in one direction and rotational angular velocity is applied, the mass experiences a force in orthogonal direction as a result of the Coriolis force. The resulting physical displacement caused by the Coriolis force may then be read from, for example, a capacitively, piezoelectrically or piezoresistively sensing structure.

In MEMS gyroscopes the primary motion is typically not continuous rotation as in conventional ones due to lack of adequate bearings. Instead, mechanical oscillation may be used as the primary motion. When an oscillating gyroscope is subjected to an angular motion, an undulating Coriolis force results. This creates a secondary oscillation orthogonal to the primary motion and to the axis of the angular motion, and at the frequency of the primary oscillation. The amplitude of this coupled oscillation can be used as the measure of the angular motion. The secondary oscillation may be called a secondary motion, a detection motion or a sense motion.

MEMS sensors have become part of many consumer devices and they are used also in a variety of safety critical applications, such as electronic stability control (ESC). Especially in the safety related applications, it is important to identify potential failures in mechanical or electrical signal paths of the sensor. MEMS gyroscopes are becoming continuously more important components for example in automated driving applications in order to allow inertial navigation during absence of external navigation data. When angular rate signal is used for navigation purposes in vehicles, it becomes highly important that the sensor is capable of fast and reliable self-diagnostics. This has become moderately pronounced also in ESC systems but is becoming more demanding in future for example with respect to detection time requirements. Ideally, the component should be capable of identifying its own erroneous operation very rapidly. On the other hand, false alarms that cause unnecessary inconvenience to system users should be effectively avoided. Thus, at the same time the sensor is required to tell whether it is malfunctioning, it should also be nearly fully insensitive toward triggering of the self-test features due to external disturbances.

A type of advanced vibratory gyroscopes applies a closed-loop system where the vibrational sense motion is feedback controlled for enhanced performance. The closed-loop configuration, however, creates also aspects that cannot be met with conventional self-test methods.

DESCRIPTION OF THE RELATED ART

U.S. Pat. No. 9,109,901 discloses a system and method for monitoring operation of a MEMS a gyroscope, where a test signal generator generates and applies a test signal to the angular rate feedback loop of the gyroscope. The test signal detector is coupled to a quadrature feedback loop. The sense loop includes demodulations and modulations in both angular rate phase and quadrature phase, and therefore an additional filtering is required within the closed-loop secondary for removing primary frequency and higher than primary frequency signal content from the signal before modulation. Thus, the speed of the feedback loop and the bandwidth of the angular rate sensor becomes limited.

U.S. Pat. No. 7,127,932 discloses a method for monitoring a rotational speed sensor with a vibrational gyroscope. Also, this solution the closed sense loop includes both modulations and demodulations both in angular rate and quadrature phase, which requires an additional filter for removing primary frequency signal content from the signal before modulation, which limits the speed of the feedback loop and the bandwidth of the angular rate sensor.

U.S. Pat. No. 9,846,037 a method and device for continuous self-test of a gyroscope, that requires high test signal magnitudes to avoid false triggering and requires selecting between robustness of the self-test and achievable error detection time.

Thus, an improved continuous self-test method and system is needed that avoids the trade-offs of the prior art.

SUMMARY

An object is to provide a method and apparatus so as to solve the problem of providing a continuous self-test that is both robust and fast, while avoiding necessity for high test signal levels.

The objects of the present invention are achieved with an apparatus according to the claim 1. The objects of the present invention are further achieved with a method according to the claim 8.

The preferred embodiments of the invention are disclosed in the dependent claims.

According to a first aspect, a microelectromechanical (MEMS) gyroscope is provided. The MEMS gyroscope comprises a drive loop comprising a drive element configured to be excited into a vibrational primary motion in a first direction, and drive loop circuitry configured to receive from a detection transducer associated with the drive element a first electrical signal for producing a quadrature-phase detection signal that corresponds to position of the drive element. The drive loop circuitry comprises a clock generating circuitry for generating from the quadrature-phase detection signal at least one test clock signal, an angular rate phase demodulation signal and a quadrature phase demodulation signal. The MEMS gyroscope further comprises a sense loop comprising a sense element configured to be driven into a vibrational sense motion in a direction that is perpendicular to the first direction, and sense loop circuitry configured to receive from a detection transducer associated with the sense element a second electrical signal corresponding to position or speed of the sense element and to generate a force-feedback signal on basis of the second electrical signal. The MEMS gyroscope also comprises a test signal generator configured to receive from the drive loop circuitry the quadrature-phase detection signal to be used as a quadrature-phase carrier signal and the at least one test clock signal configured to carry at least two test frequency signals with distinctive fundamental test frequencies, and to generate a test signal in quadrature phase by modulating the quadrature-phase carrier signal with the at least two test frequency signals.

The MEMS gyroscope also comprises a summing element configured to sum the test signal with the force-feedback signal to form a sense feedback signal to be fed back towards the sense element. The MEMS gyroscope further comprises a rate phase demodulator configured to produce a rate signal by demodulating a sense signal received from the sense loop with the angular rate phase demodulation signal, wherein the rate signal comprises angular rate information, and a quadrature-phase demodulator configured to produce a quadrature-phase output signal by demodulating the sense signal received from the sense loop with the quadrature-phase demodulation signal. The quadrature-phase output signal comprises self-test information.

According to a second aspect, the at least one test clock signal is in quadrature phase.

According to a third aspect, the sense loop circuitry comprises a frontend circuitry configured to receive the second electrical signal and to produce a sense loop output signal and a backend circuitry comprising at least one of a damping circuitry for damping the force-feedback signal and an amplifier for amplifying the sense loop output signal to produce the sense signal.

According to a fourth aspect, the at least two distinctive fundamental test frequencies are selected such that the modulated test frequency signals are within the signal band of the sense loop.

According to a fifth aspect, the MEMS gyroscope further comprises a quadrature correction circuitry configured to generate a quadrature feedback signal from the quadrature-phase output signal and to feed the quadrature feedback signal towards the sense element. The frequency of the at least two modulated test frequency signals are outside a signal band of the quadrature correction circuitry and/or one or more quadrature correction electrodes are configured to input the quadrature correction feedback signal towards the sense element.

According to a sixth aspect, the MEMS gyroscope comprises capacitive or piezoresistive electrodes for drive, detection and feedback of the drive element and for detection and force-feedback of the sense element.

According to a seventh aspect, the quadrature-phase detection signal is configured to be obtained at an output of a charge sensitive amplifier of the drive loop circuitry.

According to an eighth aspect, a wanted test clock signal frequency is configured to be obtained by dividing the quadrature-phase carrier signal frequency with an integer value and wherein the test clock signal switches its state at a zero crossing of the quadrature-phase carrier signal.

According to a first method aspect, a method for continuous self-testing of a microelectromechanical (MEMS) gyroscope is provided. The method comprises receiving a quadrature-phase detection signal from a detection transducer of a drive loop circuitry of the gyroscope, wherein the quadrature-phase detection signal corresponds to position of a drive element of the gyroscope, generating from the quadrature-phase detection signal at least one test clock signal carrying at least two test frequency signals with distinctive fundamental test frequencies, a rate phase demodulation signal and a quadrature-phase demodulation signal to be used as a quadrature-phase carrier signal, and generating a test signal in quadrature phase by modulating the quadrature-phase carrier signal with the at least two test frequency signals. The method also comprises receiving a second electrical signal corresponding to position or speed of a sense element of the gyroscope, generating a force-feedback signal in a sense loop of the gyroscope on basis of the second electrical signal, summing the test signal into the force-feedback signal to produce a sense feedback signal, and feeding the sense feedback signal towards the sense element of the gyroscope. The method further comprises producing a rate signal by demodulating a sense signal received from the sense loop with the rate phase demodulation signal, wherein the rate signal comprises angular rate information, and producing a quadrature-phase output signal by demodulating the sense signal received from the sense loop with the quadrature-phase demodulation signal, wherein the quadrature-phase output signal comprises self-test information.

According to a second method aspect, the at least one test clock signal is in quadrature phase.

According to a third method aspect, the method further comprises producing a sense loop output signal on basis of the second electrical signal, and at least one of damping the force-feedback signal before said summing and amplifying the sense loop output signal to produce the sense signal.

According to a fourth method aspect, the at least two distinctive fundamental test frequencies are selected such that the modulated test frequency signals are within the signal band of the sense loop.

According to a fifth method aspect, the method further comprises generating a quadrature feedback signal from the quadrature-phase output signal and feeding the quadrature feedback signal towards the sense element. The frequency of the at least two modulated test frequency signals are outside a signal band of the quadrature correction circuitry and/or one or more quadrature correction electrodes are configured to input the quadrature correction feedback signal towards the sense element.

According to a sixth method aspect, the method further comprises obtaining wanted test clock signal frequency by dividing the quadrature-phase carrier signal frequency with an integer value and wherein the test clock signal switches its state at a zero crossing of the quadrature-phase carrier signal.

The present invention is based on the idea of taking a carrier signal for self-test signal generation from primary loop charge-sensitive amplifier output, which carrier signal is in phase with position of the primary element of the MEMS gyroscope, and summing a self-test signal in quadrature phase into a force-feedback signal fed back towards the sense element. By selecting suitable test frequencies and designing response functions of the various signal loops of the MEMS gyroscope appropriately, the self-test signal for detecting proper functionality of major part of gyroscope signal path may be fed continuously to the MEMS gyroscope without affecting its normal, active operation.

The present invention has the advantage that it provides a robust continuous self-test with efficient immunity towards any external inertial signals, as long as they are not strong enough to inflict unwanted mechanical contact within the MEMS gyroscope, in other words exceeding the MEMS gyroscope's defined operation range. The present invention also allows fast error detection time, typically below 5 ms. Further, the present invention requires only modest test signal level despite robust operation while providing good detection coverage.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
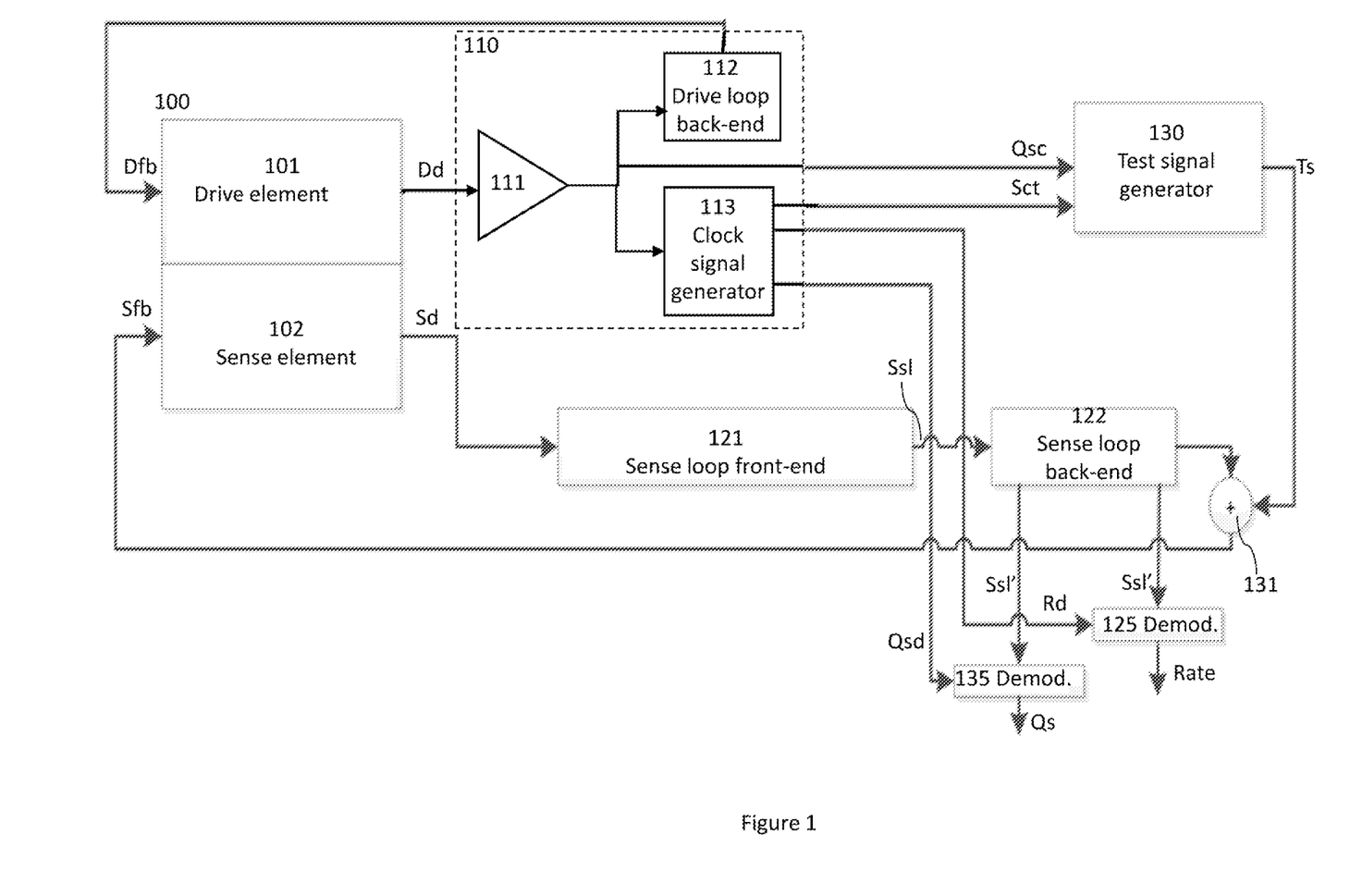
FIG. 1 is a top-level block diagram of a gyroscope.

The FIG. 1 shows a top-level block diagram of a gyroscope according to a first embodiment, that is of closed-loop type.

The gyroscope sensor element (100) comprises a drive element (101) and a sense element (102). Both the drive element (101) and the sense element (102) comprise detection means, such as a capacitive, piezoelectrical or piezoresistive transducer, that detects motion of the element and converts that into an electrical signal, and feedback means that may be used for controlling oscillation of the respective element (101; 102).

A first closed-loop system, called as the primary loop or the drive loop, controls driving of the drive element (101) into a stable mechanical oscillation at a primary frequency $f_{prim}$. Feedback enables controlling the drive motion. In case the sensor element (100) is a capacitive sensor element, drive loop electronics (110) may comprise a charge-sensitive amplifier, drive loop front-end (111) that may comprise for example a charge sensitive amplifier, CSA, that amplifies the electrical drive detection signal (Dd) received from the detection means of the drive element (101), drive loop back-end (112) comprising automatic gain control, AGC, that controls the drive feedback signal (Dfb) level in order to maintain a stable primary oscillation in the drive element (101). The drive loop front-end (111) or the drive loop electronics (110) may further comprise a filter, for example a peaking low-pass filter with a CSA or a bandpass filter with a TRA. The drive loop electronics (110) may further comprise a clock signal generator circuitry (113) that generates clock signals on basis of a primary detection signal, in other words a detection signal representing location of the oscillating primary element received from the drive loop front-end (111).

Figure 6:
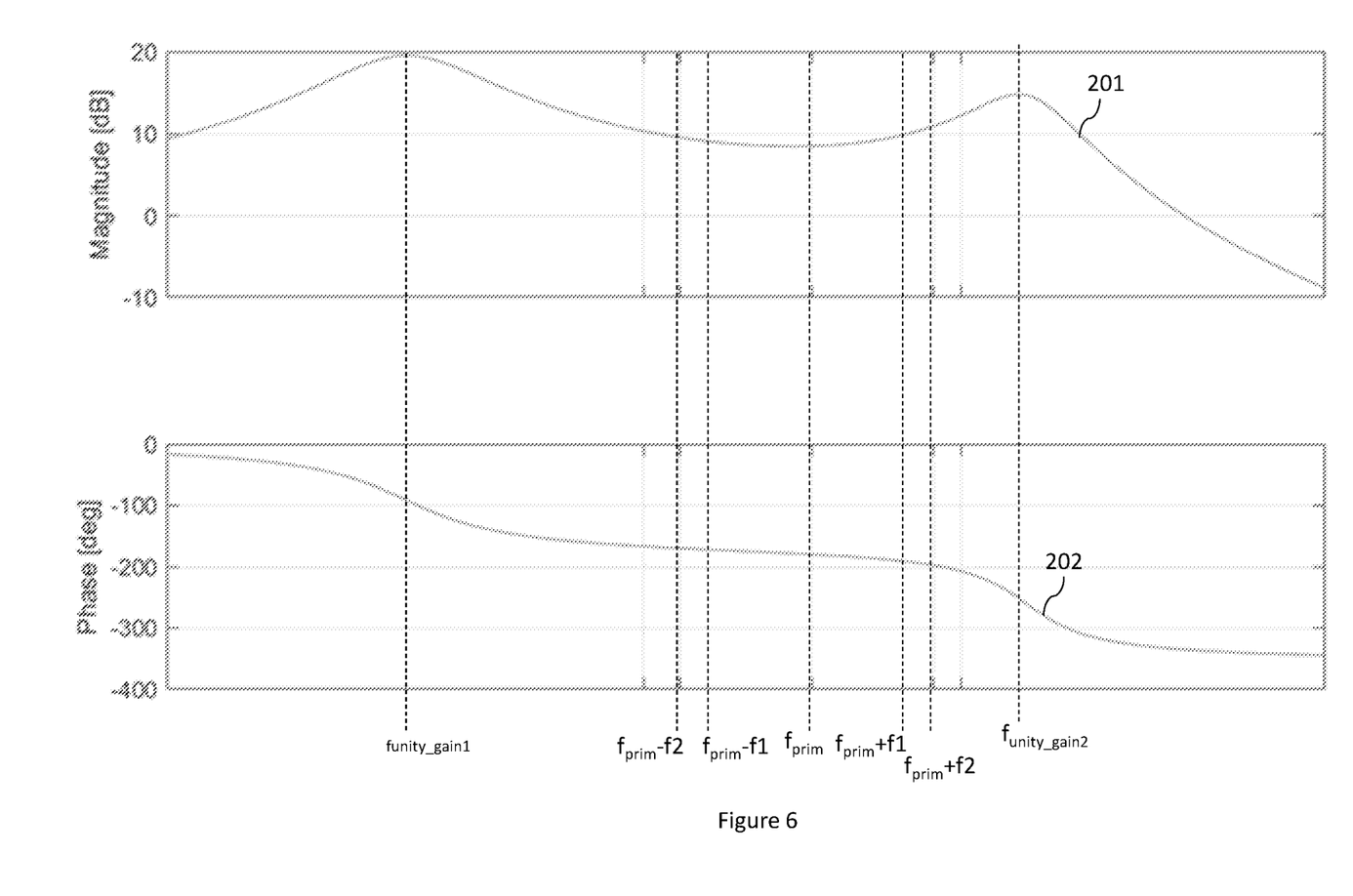
FIG. 6 illustrates test-tone frequencies against the force-feedback loop magnitude transfer function and phase transfer function.

Another closed-loop system, called as the secondary loop or the sense loop, provides detection results on basis of the Coriolis-force driven motion of the sense element (102) and executes force-feedback back towards the sense element (102) in order to improve the bandwidth and linearity of a MEMS gyroscope with equal or nearly equal drive and sense resonance frequencies. The sense loop front-end circuitry (121) receives from the sense element transducer a sense detection signal (Sd) that corresponds to the detected Coriolis motion of the sense element and generates a sense loop output signal (Ssl). The sense loop front-end circuitry (121) advantageously comprises at least a capacitance-to-voltage converter or a current-to-voltage converter, one or more gain-stages and an amplitude control element. The sense loop preferably further comprises a low-pass filter of second order, with target natural frequency equal to that of primary resonator ($f_{prim}$). The Q-value of the sense loop is preferably in range 0 to 10, while the exemplary transfer function shown in the FIG. 6 is attained with Q of 5. When the sense loop signal is used as an analog sense loop output signal (Ssl), further scaling, for example amplification or attenuation may need to be arranged to the signal path before demodulation. This scaling may conveniently be provided by a sense loop back-end circuitry (122), which provides the sense loop signal (Ssl') for an angular rate demodulator (125) that provides at its output an angular rate signal (Rate) that correlates with the detected angular rate, in other words with the rotation speed of the sense element. In the feedback path, the sense loop output signal is advantageously input to the sense loop back-end circuitry (122) for signal scaling. In the exemplary configuration of FIG. 1, the sense loop back-end circuitry (122) also generates a sense feedback signal (Sfb), according to which a force restricting the secondary vibrational motion in the sense element (102) is to be controlled. The sense loop back-end circuitry (122) may comprise a damping circuitry for creating the Sfb signal by damping the sense loop output signal (Ssl) and an amplifier for amplifying the sense loop output signal (Ssl) to generate the sense loop signal (Ssl') for demodulation.

The FIG. 1 further shows main elements of the continuous self-test arrangement. A test signal generator (130) receives at least two input signals from the primary loop (110) for generating the test signal (Ts), the at least two input signals comprising a quadrature-phase carrier signal (Qsc) and at least one test clock signal (Sct). The frequency and the phase of the quadrature-phase carrier signal (Qsc) are preferably taken directly from the primary front-end output, so that frequency of the quadrature-phase carrier signal is equal with the primary detection signal and the phase of the quadrature-phase carrier signal (Qsc) is in phase with the position of the drive element (101) and thus also in in quadrature phase in comparison to a Coriolis force signal. The test signal generator (130) further receives at least one test clock signal (Sct) that is preferably generated using the phase of the quadrature phase carrier signal (Qsc), so that the at least one test clock signal (Sct) always switches its state at a zero crossing of the quadrature phase carrier signal (Qsc). However, the at least one test clock signal (Sct) may alternatively be in phase with an in-phase signal, in other words in phase with speed of the drive element (101) and in phase with the Coriolis force signal. However, an in-phase test clock signal (Sct) would switch its polarity at its peak value, which causes large signal transients that may cause problems. Preferably, a single test clock signal (Sct) is provided that comprises at least two test frequencies, both of which are lower than the quadrature phase carrier signal (Qsc), which is equal to the primary oscillation frequency ($f_{prim}$) of the drive element. For example, test frequencies carried by the at least one test clock signal may be calculated as $f(Sct)=f_{prim}/16$ and $f(Sct)=f_{prim}/20$, but any two or more integers may be used as the dividers. In an alternative embodiment, more than one test clock signals (Sct) may be provided towards the test signal generator (130). In such case, each of the more than one test clock signals (Sct) may be configured to carry one of the different test frequencies. As known in the art, dividing a frequency with an integer value may be performed for example with a counter.

In a typical prior art system, sense loop unity gain frequency difference to primary frequency $f_{unity\_gain\_delta}$ can be made as high as 10-30% from the primary frequency $f_{prim}$. When for example $f_{unity\_gain\_delta}=0.15*f_{prim}$, the absolute force-feedback loop unity gain frequencies may vary within range $f_{unity\_gain}=(f_{prim}\pm f_{unity\_gain\_delta})=(f_{prim}\pm 0.15*f_{prim})$. This range of frequencies between the two unity gain frequencies may be referred to as a unity gain bandwidth. A broad sense loop bandwidth enables selection of test signal frequencies for modulating the quadrature-phase carrier signal that are above the required angular rate signal (Rate) frequency band, but still below unity gain frequency and therefore experiencing reduced sensitivity of magnitude and phase due to varying unity gain frequency. For example, when the angular rate (Rate) signal bandwidth is required to be 500 Hz, modulation frequency of a test tone may be 2 kHz, while $f_{unity\_gain\_delta}$ can be for example 5 kHz.

The test signal (Ts) may be summed into the sense loop with a summing element (131). When the test signal (Ts) that is generated using the quadrature-phase carrier signal (Qsc) is fed through the sense loop, it remains in quadrature phase as the sense loop does not significantly affect the signal phase when the signal traverses the sense loop. Thus, a quadrature phase signal (Qs) can be made available by demodulating the sense signal with a quadrature phase demodulator (135) using a quadrature-phase demodulation signal (Qsd), which has equal frequency and phase with the quadrature-phase carrier signal (Qsc). The quadrature-phase demodulation signal (Qsd) may be a digital or a sine-wave signal. The quadrature signal (Qs) received at the output of the quadrature phase demodulator (135) has thus been demodulated in quadrature phase in comparison to the angular rate signal demodulator (125) demodulated angular rate signal (Rate), which is demodulated using a rate phase demodulation signal (Rd). The quadrature signal (Qs) comprises self-test information and information on quadrature error. As understood by a skilled person, the quadrature-phase demodulation signal (Qsd) may comprise an insignificant angular rate phase demodulation signal component and the rate phase demodulation signal (Rd) may comprise an insignificant quadrature rate phase demodulation signal component without departing from the scope.

Preferably, the test signal (Ts) is summed with the sense feedback signal (Sfb) that is ready to be fed to the sense element (102) for force feedback. Thus, the test signal (Ts) is a part of the sense feedback signal (Sfb).

Figure 2:
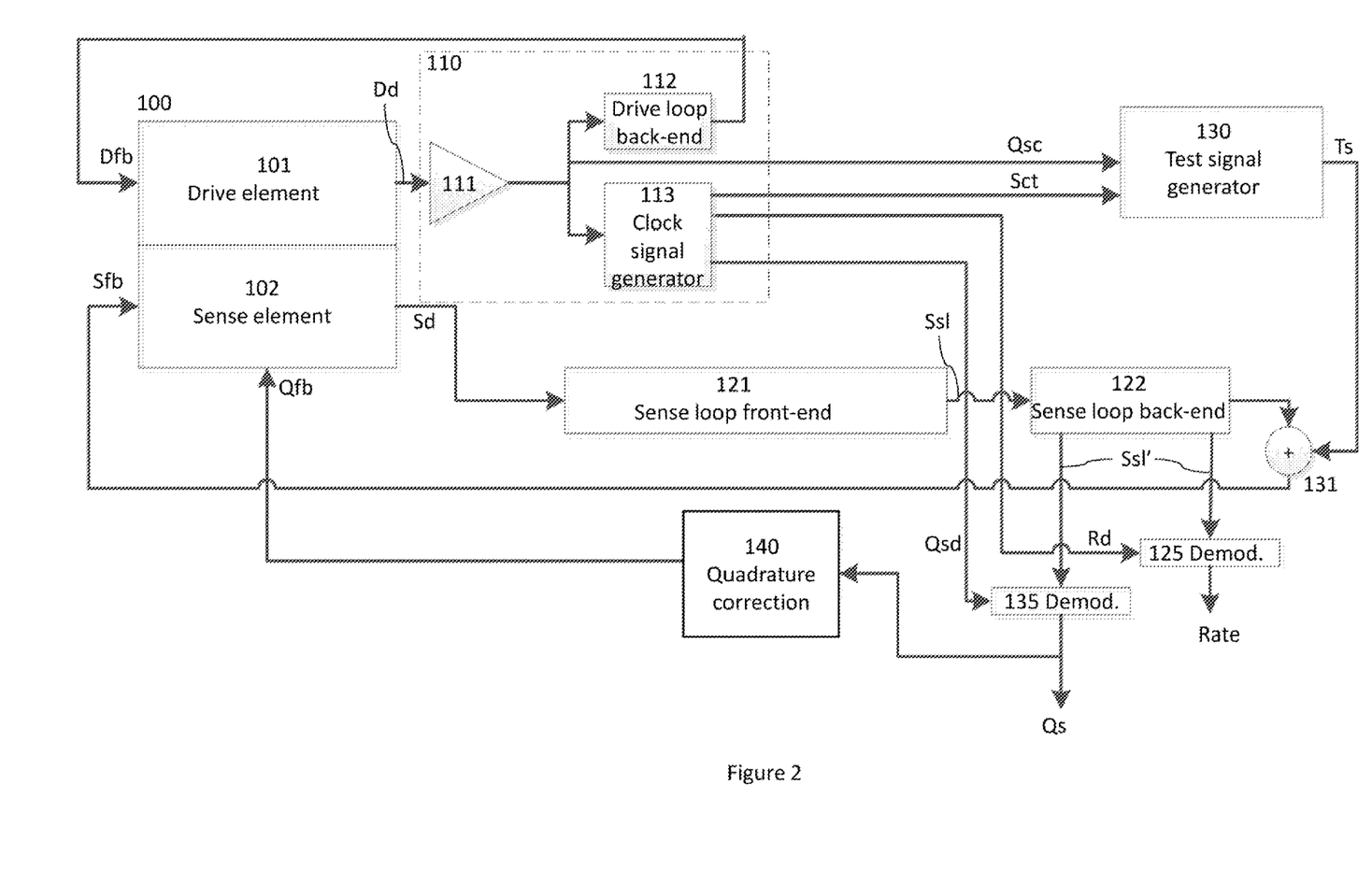
FIG. 2 is another top-level block diagram of a gyroscope.

FIG. 2 illustrates a second embodiment which is similar to that of FIG. 1, but which has further been provided with a quadrature correction circuitry (140) that is configured to generate a quadrature feedback signal (Qfb) that may be fed towards the secondary resonator of the sensor element. Frequency response function of the quadrature feedback loop is preferably limited to the wanted Rate signal frequency band or below the wanted Rate signal frequency band so that the quadrature feedback loop frequency band effectively excludes the test signal frequency band by means of the quadrature correction circuitry (140) and/or the quadrature feedback electrodes feeding the quadrature feedback signal (Qfb) back towards the sense element (102). Quadrature correction circuitry and feedback are well known in the art.

In both embodiments, the self-test information that is exclusively obtained from the quadrature signal (Qs), any external angular rate signals, which are configured to affect the angular rate phase signal (Rate) only can only affect the test signal frequencies via demodulation phase error, which is typically just few degrees with a target mean of zero. For example, a two-degree demodulation phase error still provides more than 25 times attenuation for external inertial tones compared to continuous self-test performed using angular rate phase signals.

As phase error can still cause leakage of external signals to continuous self-test tone, at least two self-test tones are needed. The test tone should have distinctive fundamental frequencies (f1, f2), in other words two frequencies which are not harmonic multiples of each other. The self-test is deemed to indicate an error only if the at least two self-test tones fail simultaneously. The first test tone (Ts_f1) may have frequency f1 and the second test tone (Ts_f2) may have frequency f2. Demodulation of the self-test output signal can be done either in analog or in digital domain.

Preferably the modulation frequency of the test signal is higher (e.g. 2 kHz) than bandwidth of a quadrature feedback loop shown in the FIG. 2. In the quadrature control loop, the demodulated quadrature signal (Qs) is provided to quadrature control circuitry (140) which processes the signal for generating a quadrature feedback signal (Qfb). Signal band of the quadrature feedback loop is preferably designed to be relatively narrow, so that signals outside the band of the primary frequency $f_{prim}$ are attenuated. This means that that despite the test signal (Ts) is fed to sense loop, it has minor effect on quadrature feedback voltage. As known in the art, the quadrature feedback loop feeds back the quadrature feedback signal (Qfb) towards the sense element (102) for compensating, in other words cancelling or reducing unwanted quadrature-phase motion of the sense element (102) caused by quadrature error in the motion of the drive element (101). Any quadrature-phase motion of the sense element (102) that is not compensated by the quadrature feedback loop is attenuated with the force-feedback functionality on basis of the sense feedback signal (Sfb). The sense loop does not distinguish between AC-type signal phases within the sense loop frequency band but attenuates all signals similarly according to their frequency characteristics. This is due to fact that the sense loop does not comprise any frequency conversions and at primary frequency the sense loop is essentially continuous time. For example, even if the sense loop is implemented as time-discrete or digital, the sampling frequency should be at least 10 times the primary frequency, which provides in practice near to continuous-time performance.

The test signal (Ts) that is not within the quadrature feedback loop frequency band is fed to the MEMS sense element (102) as part of the sense feedback signal (Sfb). Thus, it follows same signal path as the sense signal caused by the Coriolis force, but has no effect on the quadrature feedback functionality due to the frequency band difference.

Functional parameters of quadrature feedback electrodes feeding quadrature feedback signal (Qfb) back to the sense element (102) may vary over lifetime of the sensor, but these changes may not be desired to show in the test signal. Even if the quadrature feedback electrodes would change somewhat during the sensor's lifetime, they may still function well for quadrature feedback purposes and none of the sensor device's key properties such as sensitivity or offset are changed. This is accomplished now that test signal frequency is higher than the bandwidth of the quadrature control loop.

Although the invention provides a particular technical benefit in a gyroscope that applies quadrature feedback, the invention is not restricted to devices with quadrature feedback.

Figure 3:
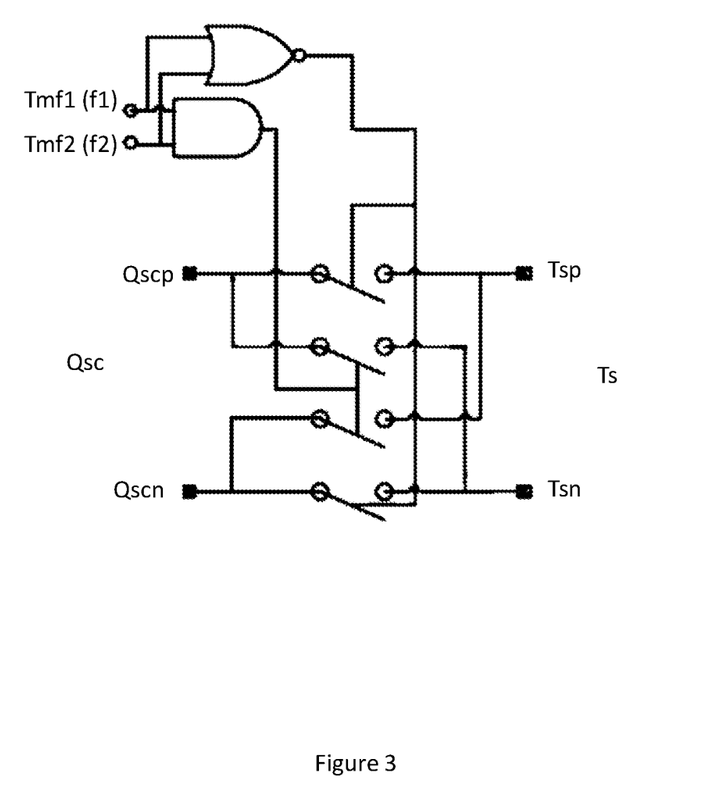
FIG. 3 illustrates components of a test signal modulator.

As a non-limiting example, the FIG. 3 illustrates components of a test signal modulator suitable for modulating of the sinusoidal quadrature-phase carrier signal (Qsc). In the FIG. 3, inputs Qscn and Qscp are signal inputs for a differential quadrature-phase carrier signal (Qsc), and test frequency inputs (Tmf1, Tmf2) are used for inputting two different test frequencies, a.k.a. test tones. The modulator circuitry is adapted to output at its differential output nodes (Tsp, Tsn) one differential test signal (Ts) that includes the quadrature-phase carrier signal modulated with two test tones (f1, f2). Modulation of signals is well known in the art, and a skilled person can select this or any other suitable type of modulator circuitry to perform this task.

Figure 4A:
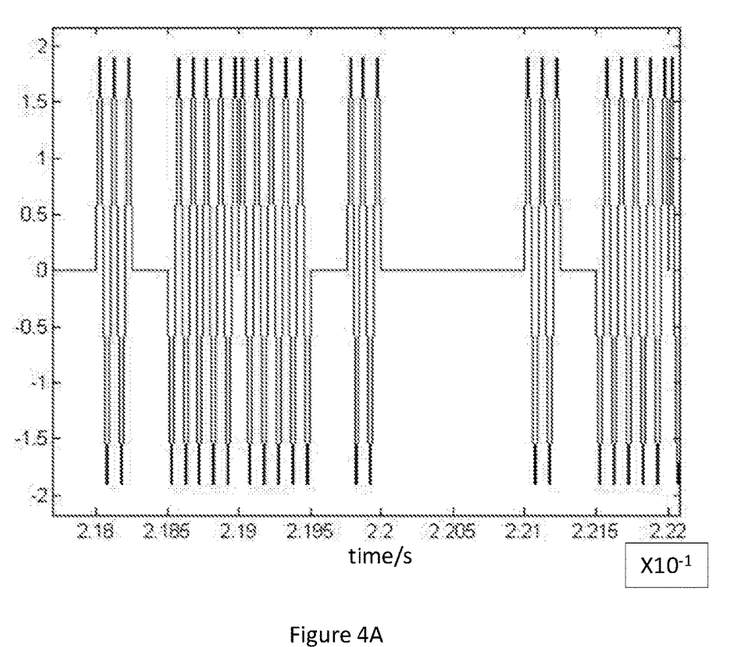
FIGS. 4A and 4B illustrate an exemplary test signal in time domain and in frequency domain.
Figure 4B:
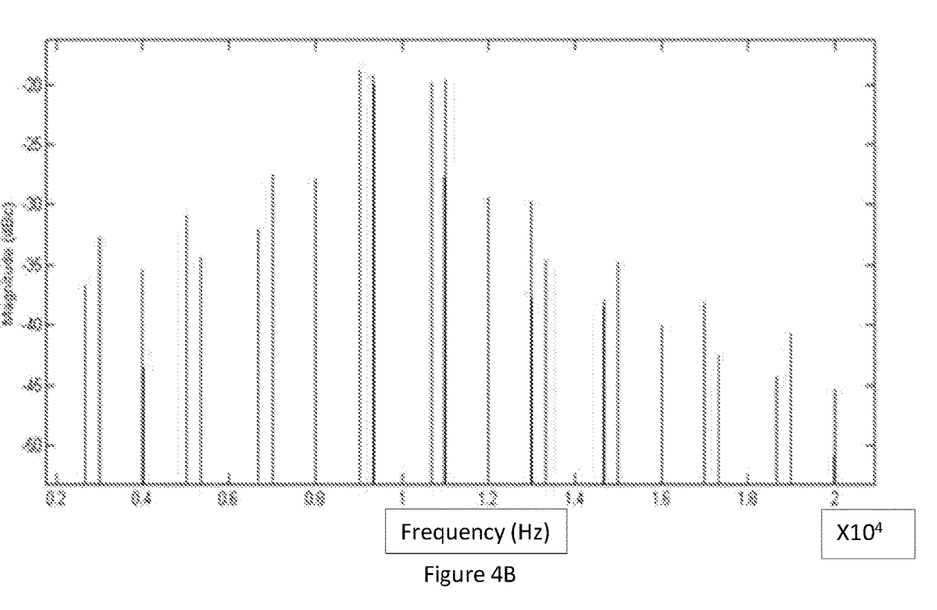
Figure 5A:
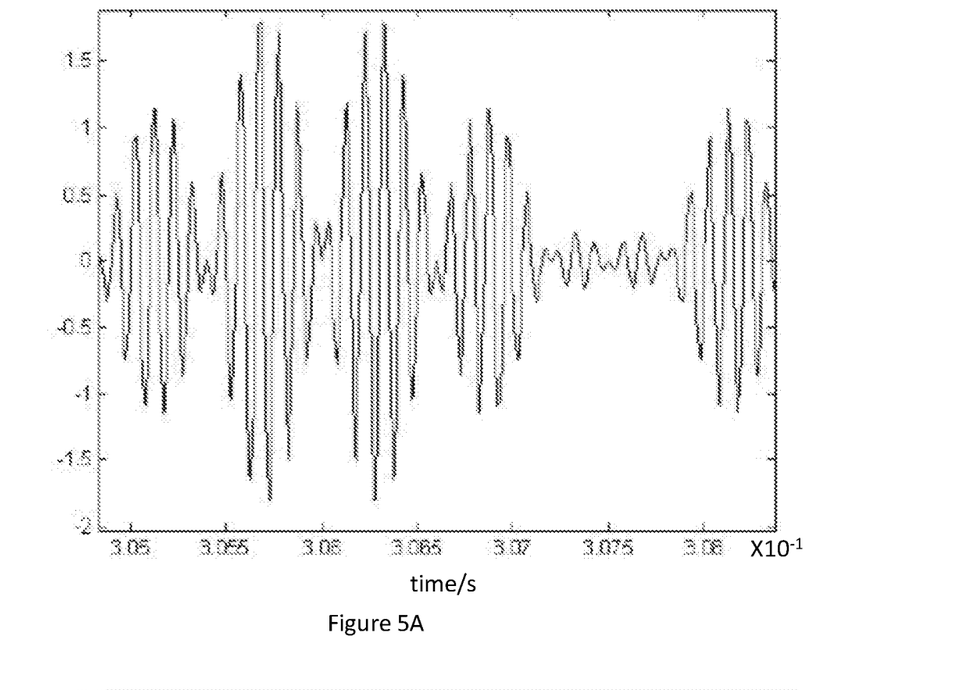
FIGS. 5A and 5B illustrate an exemplary test signal in time domain and in frequency domain.
Figure 5B:
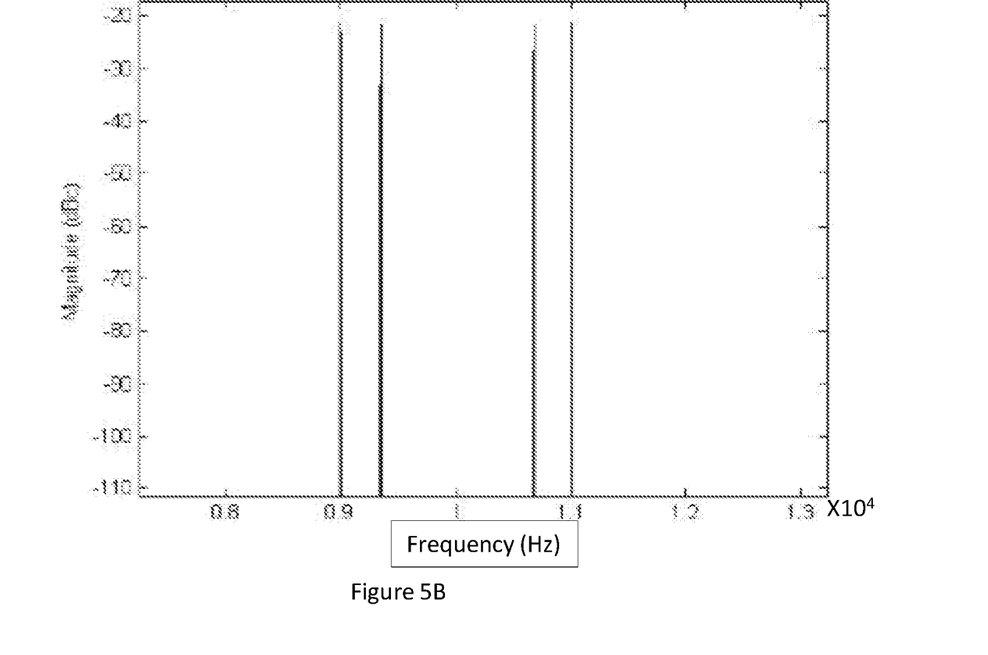

FIGS. 4A and 4B illustrate an example of test signal modulation with an exemplary test signal (Ts) that is created by modulating a 10 kHz carrier signal with two square wave test frequency signals with different fundamental frequencies. FIG. 4A shows the test signal in time domain and FIG. 4B in frequency domain. FIGS. 5A and 5B show an alternative exemplary test signal (Ts) that is created by modulating the carrier signal with two sinusoidal wave test frequency signals with different fundamental frequencies. FIG. 5A shows the test signal (Ts) in time domain and FIG. 5B in frequency domain. It is seen that in order to prevent the test from creating rotation rate offset to the actual measurement, the test signal (Ts) does preferably not contain a signal component at the exemplary resonance frequency 10 kHz.

The FIG. 6 shows an example of two test-tone frequencies (f1, f2) against the force-feedback loop magnitude transfer function (201) and phase transfer function (202). Test tone frequencies ($f_{prim}$−f1, $f_{prim}$−f2, $f_{prim}$+f1, $f_{prim}$+f2) caused by summing and subtracting the test-tone frequencies (f1, f2) with/from the quadrature-phase primary angular rate signal frequency ($f_{prim}$) used as the carrier frequency are shown in the plot. Here the wide signal band of the sense loop is visible and moderate Q-value of the resonances is helping to set the quadrature phase test tone components (Ts_f1, Ts_f2) of the test signal (Ts) out of the angular rate signal's band ($f_{prim}$) without significant phase shift. Moderate Q-value refers to a Q-value between 0 and 10. Transfer functions shown in the FIG. 6 are generated using an exemplary Q-value of 5. Two unity gain frequencies $f_{unity\_gain1}$ and $f_{unity\_gain2}$ have also been marked in the FIG. 6, indicating the frequencies at which the sense loop gain is 0 db.

Figure 7:
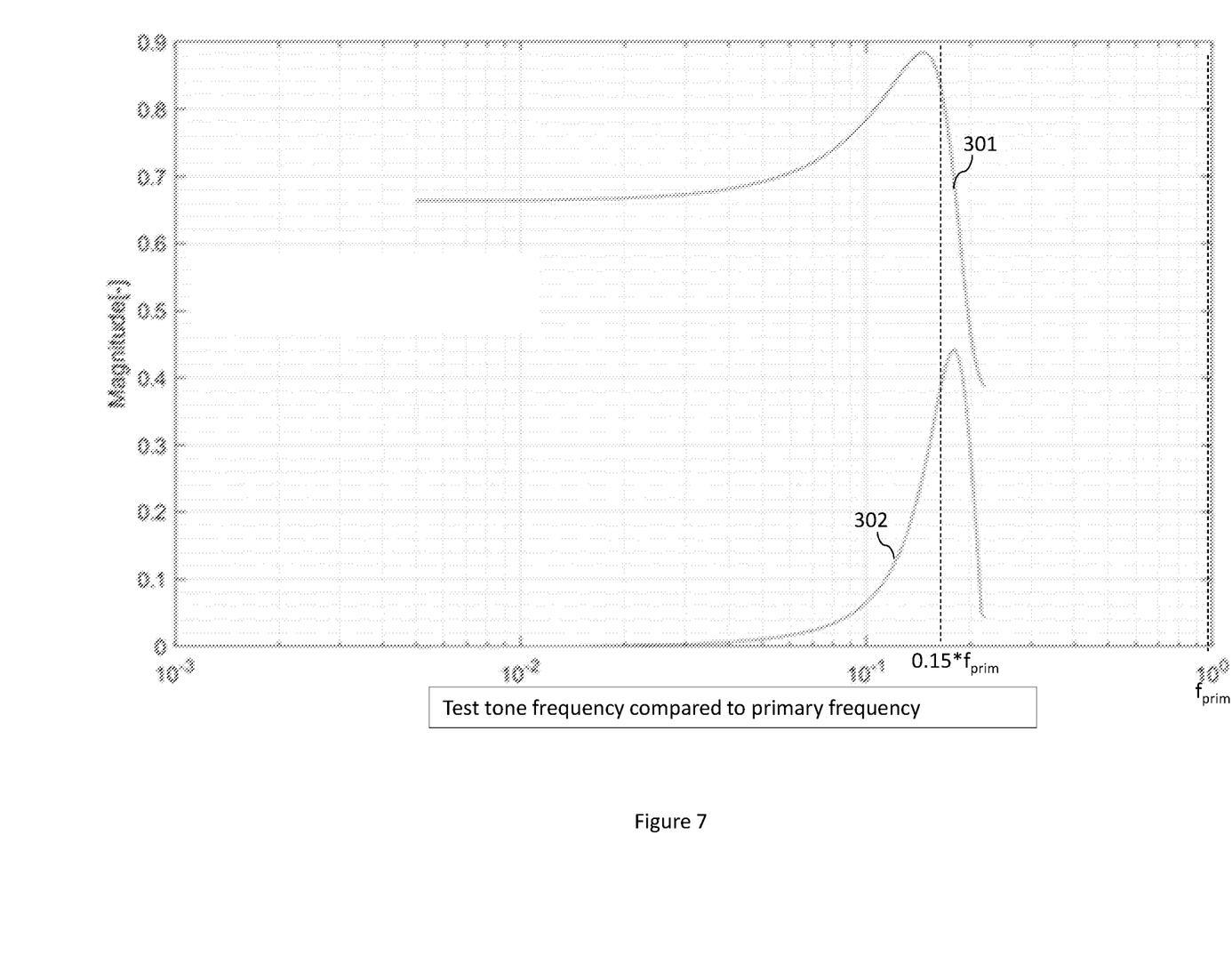
FIG. 7 is a plot showing magnitude demodulated output as function of frequency.

FIG. 7 shows a plot showing magnitude demodulated Qs output as a function of relative frequency. Here a leaked quadrature phase test tone signal (302) is showed in comparison to an in-phase demodulated signal (301) over a range of frequencies of the test tone signal expressed as the relation of the frequency in comparison to the primary frequency ($f_{prim}$) of the carrier signal of the test signal (Ts) in the exemplary system of FIG. 1, that has a sense loop transfer function as shown in the FIG. 2. The carrier signal frequency equal to the primary frequency ($f_{prim}$) in this plot is marked on the relative scale at $10^0$=1. The plot shows how I/Q-leakage increases rapidly close to unity gain bandwidth of the sense loop that is in this example about at 0.15 times the primary frequency (0.15*$f_{prim}$) in the exemplary transfer function showed in the figure.

Figure 8:
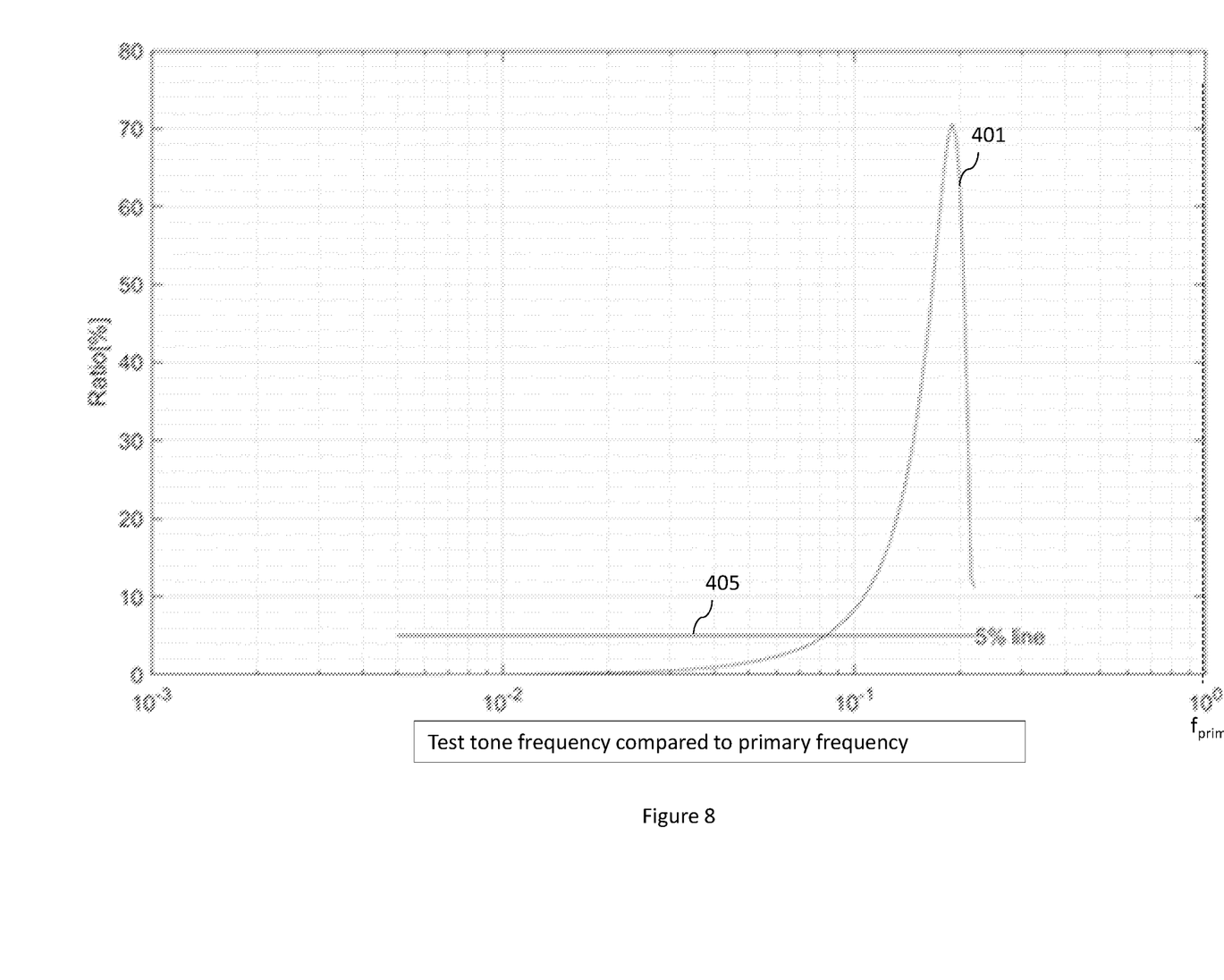
FIG. 8 illustrates relative amount of I/Q-leakage of a quadrature phase tone as a function of frequency.

FIG. 8 illustrates a plot showing relative amount of I/Q-leakage (401) of a quadrature phase tone, such as a test-tone, to an in-phase carrier signal over a range of frequencies of the quadrature phase tone signal expressed as a frequency relation in comparison to the primary frequency ($f_{prim}$) in the exemplary transfer function showed in the FIG. 6. The quadrature phase tone corresponds to a quadrature phase test tone. In this exemplary system, the relative I/Q leakage is below the marked 5% line (405) when the test tone frequency is less than about 0.085*$f_{prim}$.

Figure 9:
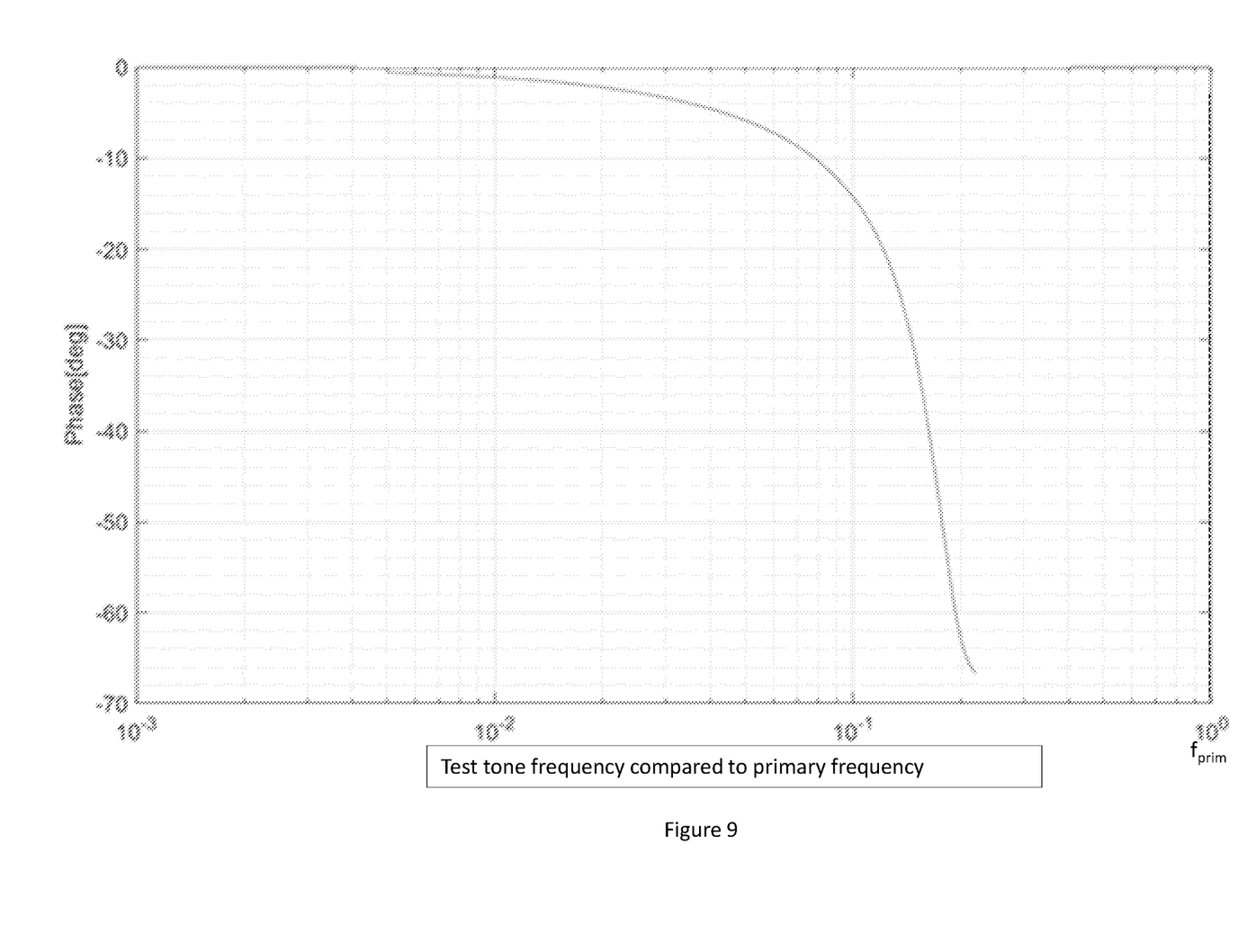
FIG. 9 illustrates phase shift of a test tone as a function of frequency.

FIG. 9 illustrates phase shift of a test tone as a function of the frequency of the test tone in comparison to the carrier signal frequency ($f_{prim}$) in the exemplary system of FIG. 1 or 2. Like in the FIGS. 7 and 8, the carrier signal frequency equal to the primary frequency ($f_{prim}$) in this plot is marked on the relative scale at $10^0$=1.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A microelectromechanical (MEMS) gyroscope, comprising:
   a drive loop comprising
      a drive element configured to be excited into a vibrational primary motion in a first direction and comprising a drive detection transducer that detects motion of the drive element and generates a first electrical signal; and
      drive loop circuitry configured to receive from the drive detection transducer associated with the drive element the first electrical signal for producing a quadrature-phase detection signal that corresponds to position of the drive element, the drive loop circuitry comprising a clock generating circuitry for generating from the quadrature-phase detection signal at least one test clock signal, an angular rate phase demodulation signal and a quadrature phase demodulation signal to be used as a quadrature-phase carrier signal, wherein a distinctive fundamental frequency of each one of at least two test frequency signals carried by the at least one test clock signal is obtained by dividing a quadrature-phase carrier signal frequency with an integer value, and wherein the test clock signal switches state at a zero crossing of the quadrature phase carrier signal;
   a sense loop comprising:
      a sense element configured to be driven into a vibrational sense motion in a direction that is perpendicular to the first direction and comprising a sense detection transducer detects motion of the sense element and generates a second electrical signal, wherein the vibrational sense motion of the sense element is caused by Coriolis-force affecting a mass moving in or with the vibrational primary motion of the drive element in the first direction; and
      sense loop circuitry configured to receive from the sense detection transducer the second electrical signal corresponding to position or speed of the sense element and to generate a force-feedback signal on basis of the second electrical signal;
   a test signal generator configured to receive from the drive loop circuitry the quadrature-phase carrier signal, and the at least one test clock signal carrying the at least two test frequency signals, and to generate a test signal in quadrature phase by modulating the quadrature-phase carrier signal with the at least two test frequency signals;
   a summing element configured to sum the test signal with the force-feedback signal to form a sense feedback signal to be fed back towards the sense element by a feedback transducer, wherein the sense feedback signal controls a force restricting the vibrational sense motion;

a rate phase demodulator configured to produce a rate signal by demodulating a sense signal received from the sense loop with the angular rate phase demodulation signal, wherein the rate signal comprises angular rate information; and a quadrature-phase demodulator configured to produce a quadrature-phase output signal by demodulating the sense signal received from the sense loop with the quadrature-phase demodulation signal, wherein the quadrature-phase output signal comprises self-test information.

2. The MEMS gyroscope according to claim 1, wherein the at least one test clock signal is in quadrature phase.

3. The MEMS gyroscope according to claim 1, wherein the sense loop circuitry comprises a frontend circuitry configured to receive the second electrical signal and to produce a sense loop output signal and a backend circuitry comprising at least one of a damping circuitry for damping the force-feedback signal and an amplifier for amplifying the sense loop output signal to produce the sense signal.

4. The MEMS gyroscope according to claim 1, wherein the distinctive fundamental test frequencies are selected such that the modulated test frequency signals are within a signal band of the sense loop.

5. The MEMS gyroscope according to claim 1, further comprising:
a quadrature correction circuitry configured to generate a quadrature feedback signal from the quadrature-phase output signal and to feed the quadrature feedback signal towards the sense element;
wherein frequencies of the at least two modulated test frequency signals are outside a signal band of the quadrature correction circuitry or one or more quadrature correction electrodes are configured to input the quadrature feedback signal towards the sense element.

6. The MEMS gyroscope according to claim 1, wherein the MEMS gyroscope comprises capacitive or piezoresistive electrodes for drive, detection and feedback of the drive element and for detection and force-feedback of the sense element.

7. The MEMS gyroscope according to claim 1, wherein the quadrature-phase detection signal is configured to be obtained at an output of a charge sensitive amplifier of the drive loop circuitry.

8. A method for continuous self-testing of a microelectromechanical (MEMS) gyroscope, the method comprising:
receiving a quadrature-phase detection signal from a drive detection transducer of a drive loop circuitry of the gyroscope, wherein the quadrature-phase detection signal corresponds to position of a drive element of the gyroscope;
generating from the quadrature-phase detection signal, at least one test clock signal carrying at least two test frequency signals with distinctive fundamental test frequencies, a rate phase demodulation signal, and a quadrature-phase demodulation signal to be used as a quadrature-phase carrier signal, wherein the distinctive fundamental test frequencies of each one of said at least two test frequency signals carried by said at least one test clock signal is obtained by dividing a quadrature-phase carrier signal frequency with an integer value and wherein the test clock signal switches state at a zero crossing of the quadrature-phase carrier signal;
generating a test signal in quadrature phase by modulating the quadrature-phase carrier signal with the at least two test frequency signals;
receiving a second electrical signal from a sense detection transducer, the second electrical signal corresponding to position or speed of a sense element of the gyroscope, wherein a vibrational sense motion of the sense element is caused by Coriolis-force affecting a mass moving in or with the vibrational primary motion of the drive element in a first direction;
generating a force-feedback signal in a sense loop of the gyroscope on basis of the second electrical signal;
summing the test signal into the force-feedback signal to produce a sense feedback signal;
feeding, by a feedback transducer, the sense feedback signal towards the sense element of the gyroscope;
producing a rate signal by demodulating a sense signal received from the sense loop with the rate phase demodulation signal, wherein the rate signal comprises angular rate information; and
producing a quadrature-phase output signal by demodulating the sense signal received from the sense loop with the quadrature-phase demodulation signal, wherein the quadrature-phase output signal comprises self-test information.

9. The method according to claim 8, wherein the at least one test clock signal is in quadrature phase.

10. The method according to claim 8, wherein the method further comprises
producing a sense loop output signal on basis of the second electrical signal, and at least one of:
damping the force-feedback signal before said summing, and
amplifying the sense loop output signal to produce the sense signal.

11. The method according to claim 8, wherein the distinctive fundamental test frequencies are selected such that the modulated test frequency signals are within a signal band of the sense loop.

12. The method according to claim 8, further comprising:
generating, by a quadrature correction circuitry, a quadrature feedback signal from the quadrature-phase output signal; and
feeding the quadrature feedback signal towards the sense element;
wherein frequencies of the at least two modulated test frequency signals are outside a signal band of the quadrature correction circuitry and/or one or more quadrature correction electrodes are configured to input the quadrature feedback signal towards the sense element.

* * * * *